(12) United States Patent
Ishii et al.

(10) Patent No.: US 10,931,845 B2
(45) Date of Patent: Feb. 23, 2021

(54) READING DEVICE, IMAGE FORMING APPARATUS, CORRECTION VALUE CALCULATING METHOD, AND STORAGE MEDIUM STORING PROGRAM CODE

(71) Applicants: Tatsuya Ishii, Kanagawa (JP); Satoshi Iwanami, Kanagawa (JP); Daisuke Nikaku, Kanagawa (JP); Masamoto Nakazawa, Kanagawa (JP); Osamu Inage, Kanagawa (JP); Shinichiroh Wada, Kanagawa (JP); Ryohma Ikemoto, Kanagawa (JP)

(72) Inventors: Tatsuya Ishii, Kanagawa (JP); Satoshi Iwanami, Kanagawa (JP); Daisuke Nikaku, Kanagawa (JP); Masamoto Nakazawa, Kanagawa (JP); Osamu Inage, Kanagawa (JP); Shinichiroh Wada, Kanagawa (JP); Ryohma Ikemoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/155,802

(22) Filed: Oct. 9, 2018

(65) Prior Publication Data
US 2019/0166275 A1    May 30, 2019

(30) Foreign Application Priority Data

Nov. 30, 2017   (JP) .............................. JP2017-231296
Jul. 23, 2018   (JP) .............................. JP2018-137931

(51) Int. Cl.
*H04N 1/03*   (2006.01)
*H04N 1/00*   (2006.01)
(Continued)

(52) U.S. Cl.
CPC ....... *H04N 1/00819* (2013.01); *G03G 15/607* (2013.01); *H04N 1/00018* (2013.01);
(Continued)

(58) Field of Classification Search
CPC .......... H04N 1/00819; H04N 1/00018; H04N 1/031; H04N 1/6044; H04N 1/02481; H04N 1/3878; H04N 3/1506
(Continued)

(56) References Cited

U.S. PATENT DOCUMENTS 4,987,485 A * 1/1991 Hirota ................... H04N 1/401
                                              348/223.1
5,864,774 A * 1/1999 Jones ..................... B41J 11/008
                                              346/103
(Continued)

FOREIGN PATENT DOCUMENTS

JP      10-093787     4/1998
JP      2015-201843   11/2015

*Primary Examiner* — Jamares Q Washington
(74) *Attorney, Agent, or Firm* — Duft & Bornsen, PC

(57) ABSTRACT

A reading device including a position reference member having a reference pattern having a line extending along a first direction of the position reference member, the position reference member movable in a second direction orthogonal to the first direction; a reader including a plurality of sensor chips arranged along the first direction, each of the sensor chips having a length defined by a plurality of pixels; and circuitry. The circuitry is configured to detect the reference pattern of the position reference member using the reader; determine coordinates of at least two sensor chips in the second direction, based on the detected reference pattern of the position reference member; and correct a position of a reading target in the second direction based on the coordinates determined for the at least two sensor chips of the reader in the second direction.

10 Claims, 12 Drawing Sheets

(51) Int. Cl.
    *H04N 1/12*       (2006.01)
    *G03G 15/00*      (2006.01)
    *B65H 5/06*       (2006.01)

(52) U.S. Cl.
    CPC ....... *H04N 1/00761* (2013.01); *H04N 1/1235*
           (2013.01); *B65H 5/068* (2013.01); *H04N*
                *1/00092* (2013.01); *H04N 2201/0094*
                                              (2013.01)

(58) Field of Classification Search
    USPC ........................................ 358/1.5, 3.26, 1.18
    See application file for complete search history.

(56) References Cited

U.S. PATENT DOCUMENTS

| | | | | |
|---|---|---|---|---|
| 6,241,334 | B1* | 6/2001 | Haselby | B41J 2/2135 |
| | | | | 347/19 |
| 6,263,117 | B1* | 7/2001 | Lee | H04N 1/047 |
| | | | | 382/254 |
| 2003/0098998 | A1* | 5/2003 | Ichihashi | H04N 1/1903 |
| | | | | 358/406 |
| 2004/0021916 | A1* | 2/2004 | Sheng | H04N 1/00002 |
| | | | | 358/504 |
| 2008/0036803 | A1* | 2/2008 | Yun | B41J 2/2146 |
| | | | | 347/9 |
| 2009/0129804 | A1* | 5/2009 | Shoji | G03G 15/043 |
| | | | | 399/72 |
| 2013/0250378 | A1* | 9/2013 | Kitai | H04N 1/00002 |
| | | | | 358/504 |

\* cited by examiner

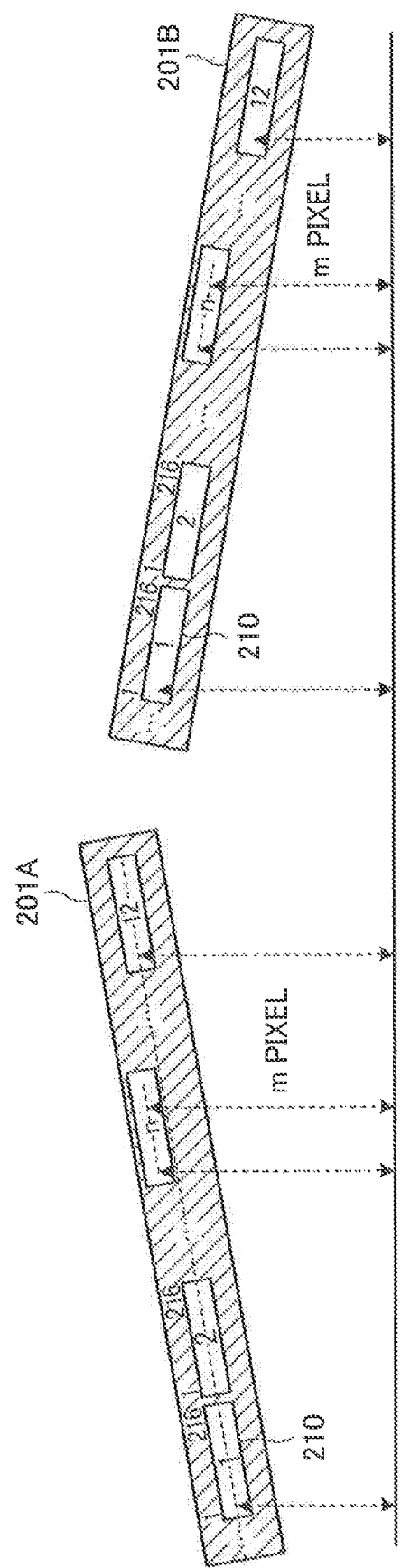

| | LEFT COORDINATE (CORRECTION VALUE 1: 10 mm) | RIGHT COORDINATE (CORRECTION VALUE 2: 5 mm) |
|---|---|---|
| COORDINATE PRIOR TO CORRECTION | 5mm | 10mm |
| COORDINATE AFTER CORRECTION | 15mm | 15mm |

START → READ HORIZONTAL LINE (S1) → DETECT COORDINATE POSITION IN SUB-SCANNING DIRECTION (S2) → STORE COORDINATE POSITION (S3) → OBTAIN CORRECTION VALUE (S4) → END

READING DEVICE, IMAGE FORMING APPARATUS, CORRECTION VALUE CALCULATING METHOD, AND STORAGE MEDIUM STORING PROGRAM CODE

CROSS-REFERENCE TO RELATED APPLICATION

This patent application is based on and claims priority pursuant to 35 U.S.C. § 119(a) to Japanese Patent Application No. 2017-231296, filed on Nov. 30, 2017 and Japanese Patent Application No. 2018-137931, filed on Jul. 23, 2018, in the Japan Patent Office, the entire disclosures of which are hereby incorporated by reference herein.

BACKGROUND

Technical Field

Embodiments of the present disclosure relates to a reading device, an image forming apparatus incorporating the reading device, a correction value calculating method, and a storage medium storing program code for causing a computer to execute the method.

Background Art

The technology has been known that reads the outer edge position and the processing position of a conveyed object using a reader such as a contact image sensor (CIS) mounted in a reading device so as to correct a position to which the conveyed object has been conveyed and the processing position of the conveyed object.

Further, the technology is also known that detects displacement of the installation position of the reader by reading a proof sheet.

SUMMARY

In one aspect of this disclosure, there is provided an improved reading device including a position reference member having a reference pattern having a line extending along a first direction of the position reference member, the position reference member movable in a second direction orthogonal to the first direction; a reader including a plurality of sensor chips arranged along the first direction, each of the sensor chips having a length defined by a plurality of pixels; and circuitry. The circuitry is configured to detect the reference pattern of the position reference member using the reader; determine coordinates of at least two sensor chips in the second direction, based on the detected reference pattern of the position reference member; and correct a position of a reading target in the second direction based on the coordinates determined for the at least two sensor chips of the reader in the second direction.

In another aspect of this disclosure, there is provided an improved method of calculating a correction value using a position reference member including a reference pattern having a line extending along a first direction of the position reference member, the position reference member movable in a second direction orthogonal to the first direction, and a reader including a plurality of sensor chips arranged along one direction of the reader. The method includes detecting, using the reader, the reference pattern having the line extending along the first direction of the reference pattern member, the reference pattern corresponding to each of the plurality of sensor chips arranged along the one direction in the reader, and each of the sensor chips having a length defined by a plurality of pixels; determining coordinates of at least two sensor chips in the second direction, among the plurality of sensor chips, based on the detected reference pattern of the position reference member; and correcting a position of a reading target in the second direction based on the coordinates determined for the at least two sensor chips of the reader in the second direction.

In still another aspect of this disclosure, there is provided an improved image forming apparatus including the reading device; a print engine; and circuitry. The circuitry is configured to control a conveyance of a recording medium onto which an image is formed by the print engine; detect an outer shape of the recording medium and a position of an image pattern on the recording medium by reading the image formed on the recording medium using the reading device; and correct a position of a reading target in the second direction based on the coordinates determined for the at least two sensor chips of the reader in the second direction.

In yet another aspect of this disclosure, there is provided an improved non-transitory recording medium storing a program for causing a computer to execute the above-described method.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 11 is an illustration of a method of correcting inclination of two readers according to an embodiment of the present disclosure;

Figure 1:
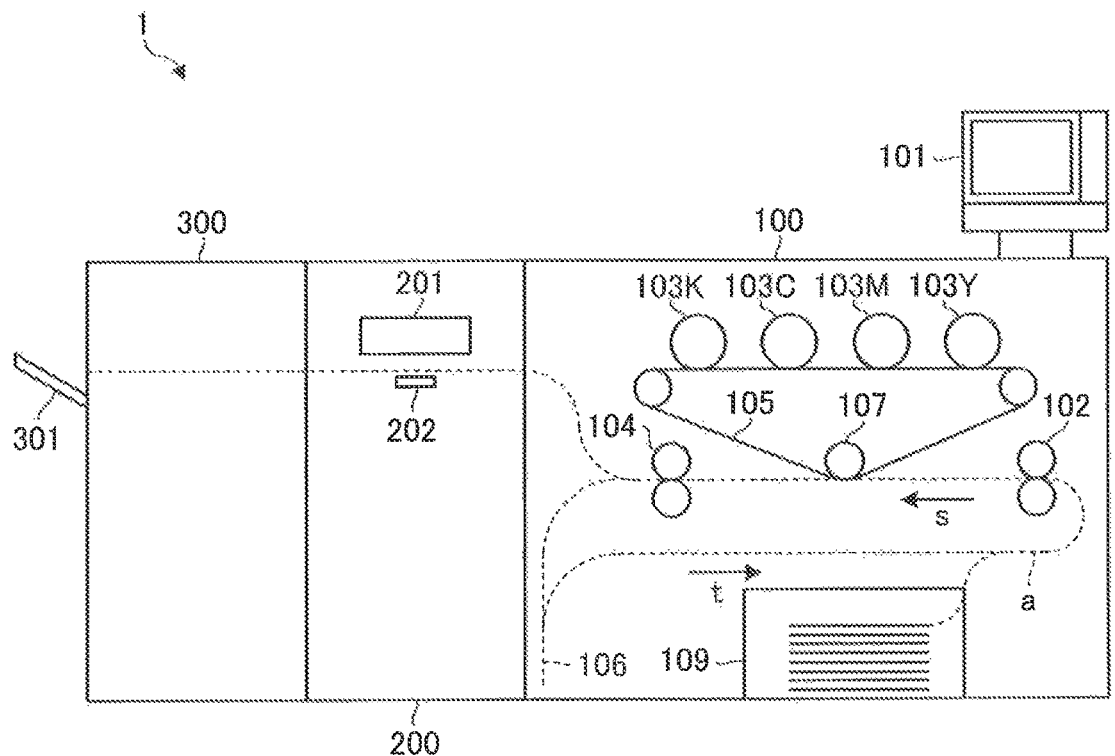
FIG. 1 is a schematic illustration of a hardware configuration of a printing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results. As used herein, the singular forms "a", "an", and "the" are intended to include the plural forms as well, unless the context clearly indicates otherwise.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

With initially reference with the figures, a description is provided below of embodiments of a reading device, an image forming apparatus incorporating the reading device, a correction value calculating method, and program. In the following, the cases where the reading device and the image forming apparatus are applied to a printing system provided with a printing device such as a commercial printing machine (production printing machine) that prints a large number of sheets continuously in a short period of time are described. However, no limitation is intended thereby.

FIG. 1 is a schematic illustration of a hardware configuration of a printing system 1 according to an embodiment of the present disclosure. As illustrated in FIG. 1, the printing system 1 as an image forming apparatus includes a printing device 100, a medium position detector 200 (an example of a position detector), and a stacker 300.

The printing device 100 includes an operation panel 101, tandem type electrophotographic image forming units 103Y, 103M, 103C, and 103K, a transfer belt 105, a secondary transfer roller 107, a sheet feeder 109, a pair of conveying rollers 102, a fixing roller 104, and a sheet reverse path 106.

The operation panel 101 is an operation display unit that enables a user to input various operations to the printing device 100 and the medium position detector 200 and displays various screens.

In the printing device 100, a toner image is formed on each of the image forming units 103Y, 103M, 103C, and 103K by an image forming process (a charging process, an exposing process, a developing process, a transfer process, and a cleaning process), and the formed toner image is transferred onto the transfer belt 105. In the present embodiment, a yellow toner image is formed on the image forming unit 103Y, a magenta toner image is formed on the image forming unit 103M, a cyan toner image is formed on the image forming unit 103C, and a black toner image is formed on the image forming unit 103K. However, no limitation is intended thereby.

The transfer belt 105 conveys the toner image (full-color toner image) in which the toner images of the image forming units 103Y, 103M, 103C, and 103K are transferred to be superimposed on each other, to the secondary transfer position of the secondary transfer roller 107. In the present embodiment, a yellow toner image is first transferred to the transfer belt 105, and a magenta toner image, a cyan toner image, and a black toner image are sequentially superimposed one atop another on the transfer belt 105 while being transferred from the image forming units 103Y, 103M, 103C, and 103K as the transfer belt 105 rotates. However, no limitation is intended thereby.

The sheet feeder 109 accommodates a plurality of recording media to be processed (a conveyed objects) in a superposed manner, and feeds a recording medium. Examples of the recording medium include recording paper (transfer paper). However, the recording medium is not limited to this, and examples of the recording medium may include media capable of recording images such as coated paper, thick paper, overhead projector (OHP) sheets, plastic films, and copper foil.

In the present embodiment, the recording medium on which an image is to be formed is the object to be processed (conveyed object). However, no limitation is indicated thereby. Alternatively, for example, a sheet that is not a target on which an image is to be formed such as pregreg may be an object to be processed (conveyed object).

The pair of conveying rollers 102 conveys the recording medium fed by the sheet feeder 109 in the direction of arrow s on the conveying path a.

The secondary transfer roller 107 collectively transfers the full-color toner image conveyed by the transfer belt 105 onto the recording medium conveyed by the pair of conveying rollers 102 at the secondary transfer position.

The fixing roller 104 fixes the full-color toner image on the recording medium by heating and pressurizing the recording medium onto which the full-color toner image is transferred.

In the case of single-sided printing, the printing device 100 sends printed material that is the recording medium on which the full-color toner image has been fixed, to the medium position detector 200. On the other hand, in the case of duplex printing, the printing device 100 sends the recording medium on which the full-color toner image has been fixed, to the sheet reverse path 106.

The sheet reverse path 106 reverses the front and back surfaces of the recording medium by switching back the fed recording medium, and conveys the recording medium in the direction of the arrow t. The recording medium conveyed through the reversing path 106 is conveyed again by the pair of conveying rollers 102, and a full-color toner image is transferred to the surface of the recording medium opposite to the previously transferred surface by the secondary transfer roller 107. The transferred full-color toner image is fixed to the surface by the fixing roller 104, and the recording medium is sent as printing material to the medium position detector 200 and to the stacker 300.

The medium position detector 200 located downstream of the printing device 100 includes a reader 201 and a position reference member 202.

The reader 201 is implemented by, for example, a CIS in which a plurality of image sensors such as complementary metal oxide semiconductors (CMOS's) are arranged in line. The reader 201 receives light reflected by a reading target and outputs an image signal. Specifically, the reader 201 reads the position (conveyance position) to which the recording medium is conveyed from the printing device 100 and the processing position (printing position) of the recording medium. Further, the reader 201 reads the position reference member 202 as an object to be read.

The CIS used in the reader 201 is typically configured to include a plurality of sensor chips 210 (see FIG. 4) along the main scanning, each of the sensor chips 210 including a plurality of pixels. Thus, the CIS has an effective reading length in the main scanning direction.

The position reference member 202 is a reference plate for correcting an installation position of each sensor chip 210 of the reader 201 including the plurality of sensor chips 210. By correcting the installation position of each sensor chip 210 of the reader 201 using the position reference member 202 as described above, the position of the image can be detected at higher accuracy.

Then, the medium position detector 200 discharges the recording medium read by the reader 201, to the stacker 300.

The stacker 300 includes, for example, a tray 301. The stacker 300 stacks the recording medium discharged by the medium position detector 200, onto the tray 301.

Next, a description is given below of the reader 201 and the position reference member 202 in the medium position detector 200.

The method, in which the outer edge position and the processing position of a conveyed object are read by the reader such as the CIS so as to correct the conveyance position and processing position of the conveyed object, might result in deterioration in accuracy.

Figure 2:
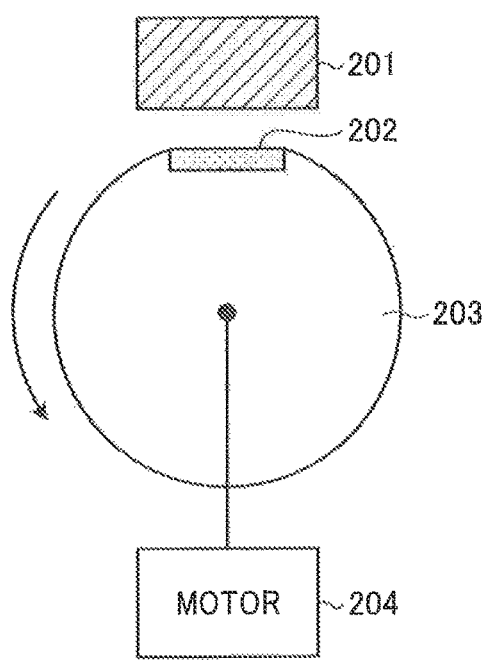
FIG. 2 is an illustration of a reader and the position reference member of a reading device according to an embodiment of the present disclosure.

FIG. 2 is an illustration of the reader 201 and the position reference member 202 according to an embodiment of the present disclosure. As illustrated in FIG. 2, the position reference member 202 is provided on a rotator 203 that is rotationally driven by a motor 204.

That is, the position reference member 202 is moved by the rotator 203 that is rotated at a constant speed by the motor 204. The position reference member 202 moves to face the reader 201 at a predetermined timing as the rotator 203 rotates.

The position reference member 202 is rotated at a constant speed along the sub-scanning direction as described above so that the reader 201 can read a reference line X (see FIG. 4) as a reference pattern including a line extending in a predetermined direction on the position reference member 202. As a result, the inclination of the position reference member 202 in the sub-scanning direction can be detected.

In FIG. 2, the position reference member 202 is attached to the rotator 203 and the position reference member 202 is moved at a constant speed in the sub-scanning direction. However, no limitation is intended thereby. For example, the position reference member 202 may be disposed to linearly move.

In FIG. 2, the position reference member 202 is configured to move at a constant speed in the sub-scanning direction. Alternatively, the reader 201 may be moved at a constant speed in the sub-scanning direction instead.

Figure 3:
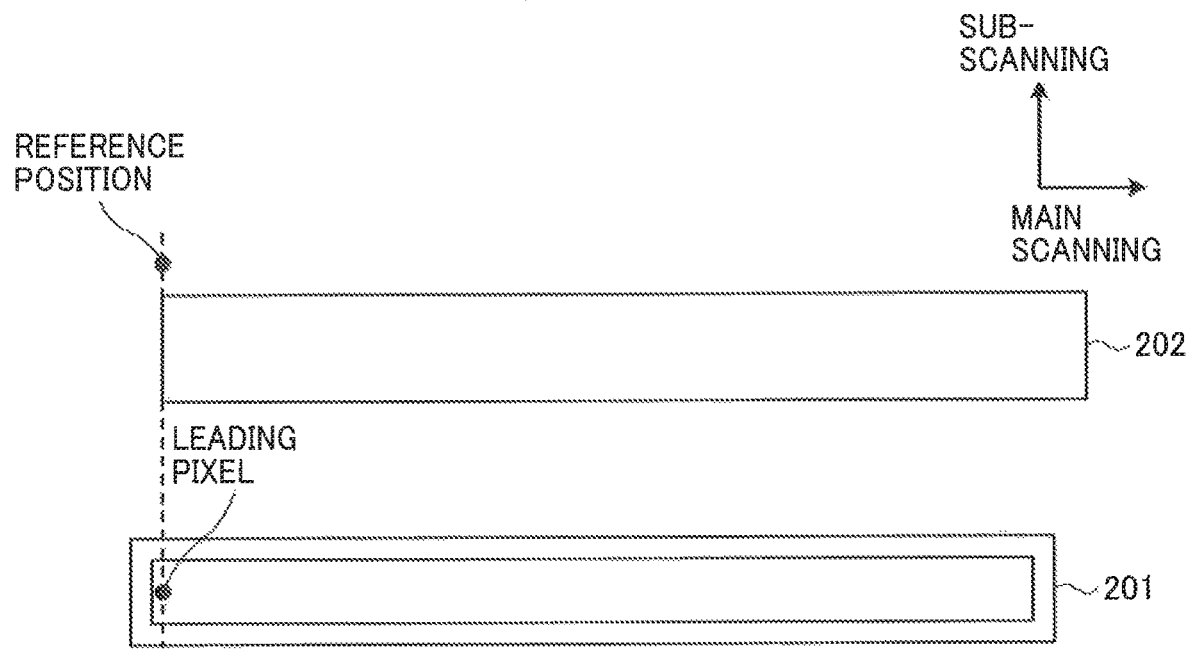
FIG. 3 is an illustration of the relative positions of the reader and the position reference member in FIG. 2.

FIG. 3 is an illustration of the relative positions of the reader 201 and the position reference member 202.

As illustrated in FIG. 3, the position reference member 202 has a reference position (support point) that corresponds to the position of a leading pixel of the image sensor at one end (leading end) of the reader 201 in the main scanning direction.

Further, the reader 201 also has a reference position (support point) that corresponds to a position of the leading pixel corresponding to the reference position of the position reference member 202.

The following describes issues when the CIS is applied to the reader 201.

Figure 4:
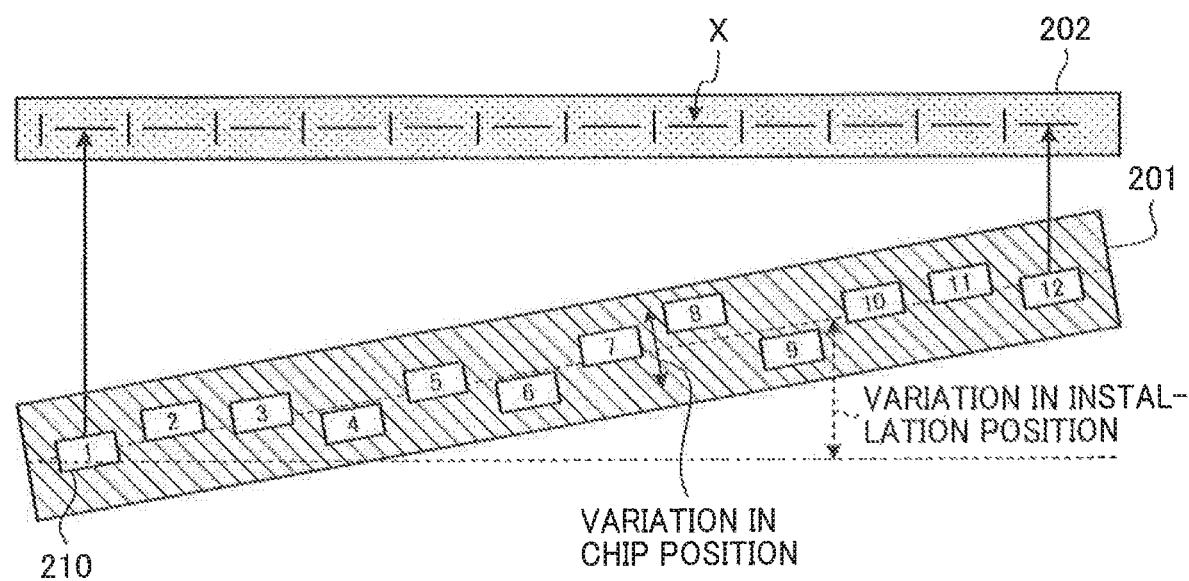
FIG. 4 is an illustration for explaining difficulties in applying a CIS to the reader.

FIG. 4 is an illustration for explaining issues in applying a CIS to the reader 201.

As illustrated in FIG. 4, for example, when the reader 201 is attached obliquely to the position reference member 202, the position of the position reference member 202 is detected less accurately even if the reader 201 receives light reflected by the reading target and reads an image corresponding to the received light. Thus, the accuracy of the position detection of the position reference member 202 reduces and a proper correction operation fails (variation in installation positions).

In addition, when the CIS is applied to the reader 201 as illustrated in FIG. 4, the pixels are arranged uniformly and linearly in each sensor chip 210, but the positions of the plurality of sensor chips 210 in the sub-scanning direction may not be aligned on the same line (variation in chip positions in the sub-scanning direction).

In view of such circumstances, the following configurations are proposed to improve the accuracy of detection of the positions.

Figure 5:
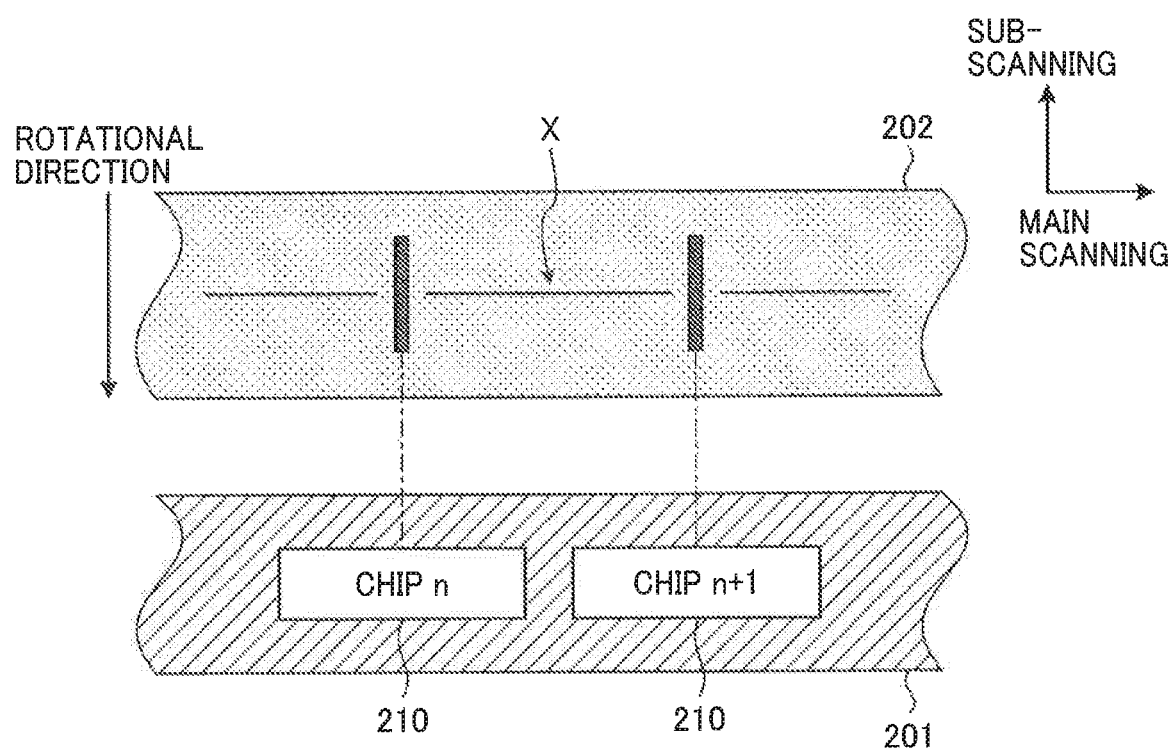
FIG. 5 is an illustration of an example of the reference line arranged on the position reference member according to an embodiment of the present disclosure.

FIG. 5 is an illustration of an example of a reference line X arranged on the position reference member 202.

As illustrated in FIG. 5, a reference line X having a given length is arranged on the position reference member 202. The reference line X arranged on the position reference member 202 includes, for example, a first line X1 (horizontal line X1) parallel with the main scanning direction (a predetermined direction) of the reader 201 and a second line X2 (vertical line) extending in a direction orthogonal to the main scanning direction.

As illustrated in FIG. 5, the vertical line X2 of the reference line X is arranged at a position corresponding to the center of each sensor chip 210 on the substrate of the reader 201.

Further, the vertical lines X2 of the reference line X are arranged at equal interval on the position reference member 202 to correspond to the respective sensor chips 210 on the substrate of the reader 201. Thus, each sensor chip 210 can read the vertical line X2.

The vertical line X2 is used to correct the position of the sensor chip 210 in the main scanning direction. In addition, the inclination of the sensor chip 210 may be corrected more accurately by correcting the position in the main scanning direction of the sensor chip 210 with the vertical line X2.

In addition, each horizontal line of the reference line X is arranged between the vertical lines over the plurality of sensor chips 210 on the substrate of the reader 201.

As illustrated in FIG. 5, a gap is formed between the vertical line and the horizontal line on the position reference member 202. With such a configuration, even if the horizontal line falls within the reading range of the reader 201, the coordinate of the vertical line can be calculated.

However, the reference line X is not limited to such a configuration and may have a configuration in which the vertical line X2 and the horizontal line X1 are in contact with each other.

Ideally, a horizontal line detection unit 112 (FIG. 8) reads the horizontal line X1 for each sensor chip 210 of the reader 201 to detect a coordinate of each sensor chip 210 in the sub-scanning direction, and reads two horizontal lines X1 corresponding to the sensor chips 210 at both ends of the reader 201 to detect the inclination of the reader 201, so as to correct the reading result of the reader 201. However, such a configuration exhibits the following disadvantageous effects:

1) the processing to be performed becomes complicated and takes more time because a position in the sub-scanning direction is to be detected for each pixel;

2) the correction values of all the pixels are obtained and recorded in a memory, which requires a memory capacity sufficient to store all the pixel correction values; and 3) information is extracted from a table having a greater number of data when using the correction value so that the processing to be performed becomes complicated and takes more time.

In view of such circumstances, in at least one embodiment of the present disclosure, the horizontal line detection unit 112 reads two horizontal lines X1 corresponding to the sensor chips 210 at the both ends of the reader 201 so as to detect two coordinates in the sub-scanning direction, thus obtaining inclination of the reader 201 from the two coordinates in the sub-scanning direction.

Then, the inclination degree of each sensor chip 210 (each pixel) of the reader 201 is obtained from the total inclination of the reader 201 obtained by reading the two horizontal lines X1 corresponding to the sensor chips 210 at the both ends of the reader 201. Thus, the processing load required for the operations of detecting positions in the sub-scanning direction and recording the detection results can be reduced.

If the position reference member 202 expands and contracts due to any effect (e.g., the heat generation of the peripheral components), the position reference member 202 fails to function as an absolute positional reference. As a result, the accuracy of the detection of the positions might deteriorate. To avoid such a situation, the position reference member 202 according to the embodiments of the present disclosure is made of material whose linear expansion coefficient is lower than that of the substrate of the reader 201 and whose amount of expansion and contraction due to the effect of ambient temperature is negligibly small for detecting the position.

In the present embodiment, the position reference member 202 is made of, for example, glass in consideration of an assumed temperature variation range and linear expansion coefficient related to the assumed temperature variation range.

It should be noted that the material of the position reference member 202 is not limited to such material, and it is preferable to use quartz glass or the like in order to detect the position of a medium at higher accuracy when the temperature variation range of the reader 201 is wide.

Figure 6:
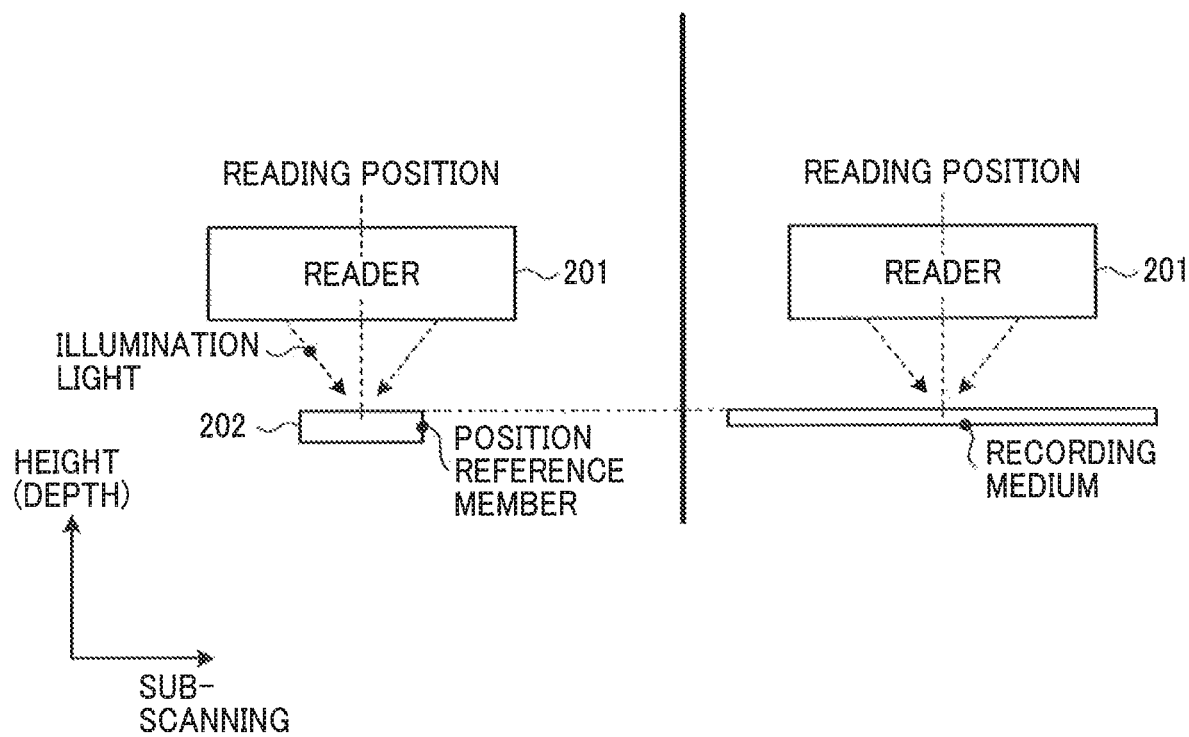
FIG. 6 is an illustration of the relative positions of the position reference member and the reader according to an embodiment of the present disclosure.

FIG. 6 is an illustration for describing the relative positions of the position reference member 202 and the reader 201. The reader 201 such as CIS typically has characteristics that image characteristics change with the height (depth) direction.

Typical examples of such image characteristics include a modulation transfer function (MTF) (depth of focus) and depth of illumination. Some types of readers 201 have characteristics that differ with the position in the main scanning direction, in addition to the height (depth).

In view of such characteristics, in the present embodiment, the position reference member 202 and the reader 201 are disposed such that the depth (height) directional position at which the reader 201 reads the recording medium matches the depth (height) at which the reader 201 reads the reference line X on the position reference member 202.

With such a configuration, the effects of the changes in image characteristics can be reduced, in particular minimized, and thus the accuracy of the detection of the positions can be improved.

Figure 7:
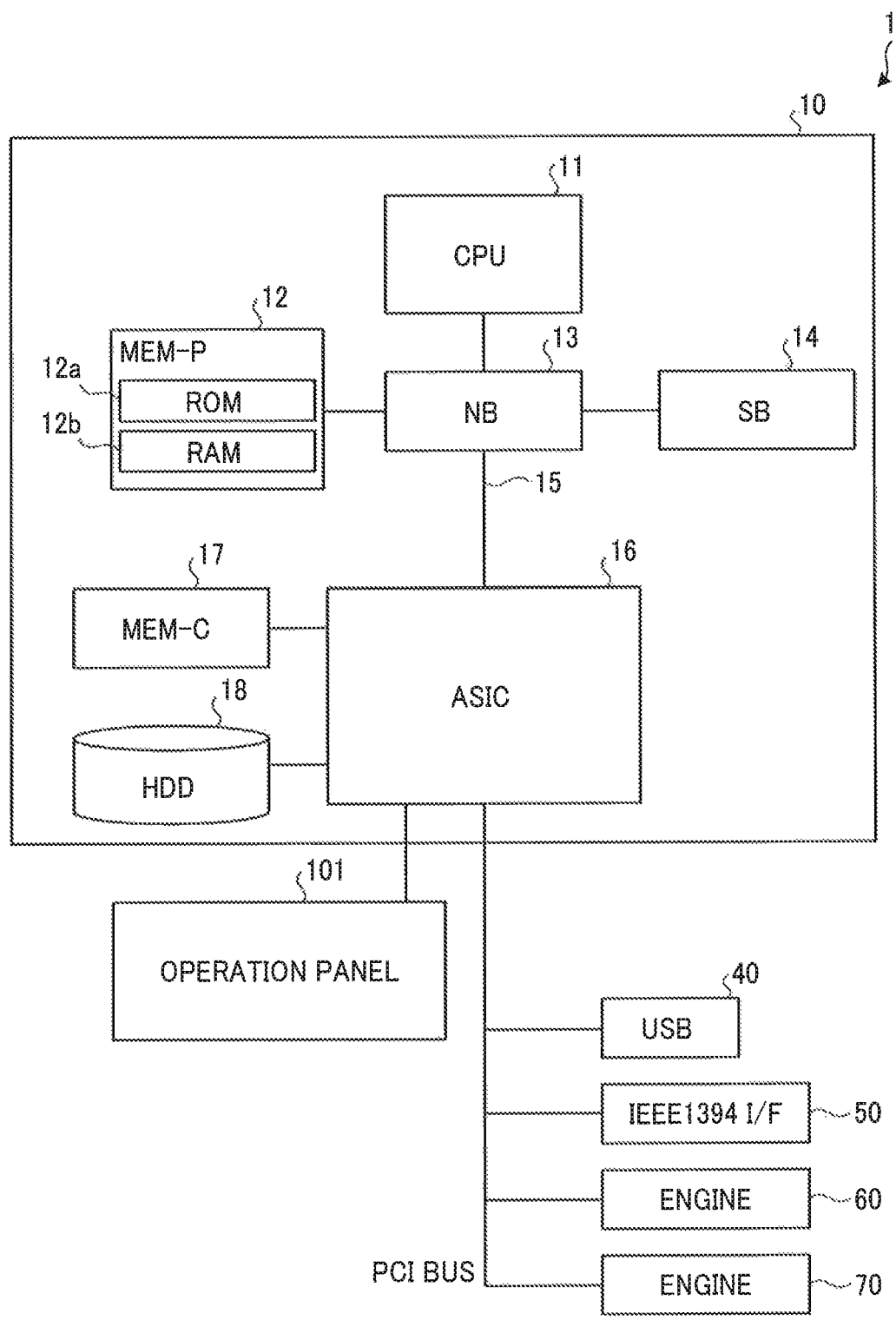
FIG. 7 is a block diagram of a hardware configuration of the printing system in FIG. 1, describing an example of electric connection of hardware elements.

FIG. 7 is a block diagram of a hardware configuration of the printing system 1, describing an example of electric connection of hardware components.

As illustrated in FIG. 7, the printing system 1 includes a controller 10 and engines 60 and 70, which are connected with each other via a peripheral component interface (PCI) bus.

The controller 10 controls entire operation of the printing system 1. In an example operation, the controller 10 controls drawing, communication, or user inputs to an operation panel 101 as an operation display unit. The engine 60 is an engine connectable to the PCI bus 919. Examples of the engine 60 includes a scanner engine such as the reader 201.

The engine 60 includes, in addition to the engine part, an image processing part such as error diffusion or gamma conversion. The engine 70 is an engine connectable to the PCI bus 919. Examples of the engine 70 includes a print engine such as a plotter including the image forming units 103Y, 103M, 103C, and 103K.

The controller 10 includes a central processing unit (CPU) 11, a north bridge (NB) 13, a system memory (MEM-P) 12, a south bridge (SB) 14, a local memory (MEM-C) 17, an Application Specific Integrated Circuit (ASIC) 16, and a hard disc drive (HDD) 18. The NB 13 and the ASIC 16 are connected through an Accelerated Graphics Port (AGP) bus 15. Further, the MEM-P 12 includes a read only memory (ROM) 12a and a random access memory (RAM) 12b.

The CPU 11 controls entire operation of the printing system 1. The CPU 11 is connected to another device via a chip set constituted by the NB 13, the MEM-P 12, and the SB 14.

The NB 13 is a bridge for connecting the CPU 11, the MEM-P 12, the SB 14, and the AGP bus 15 to one other. The NB 13 includes a memory controller to control reading and writing data to and from the MEM-P 12, a PCI master, and an AGP target.

The MEM-P 12 is a system memory used as, for example, a memory to store programs or data, a memory to deploy programs or data, and a memory to store drawing data for printing. The MEM-P 12 includes the ROM 12a and the RAM 12b.

The ROM 12a is a read only memory used as a memory to store programs or data. The RAM 12b is a read-write memory used as, for example, a memory to deploy programs or data and a memory to store drawing data for printing.

The SB 14 connects the NB 903 with a PCI device or a peripheral device. The SB 14 is connected to the NB 12 via the PCI bus. The network interface (I/F) and the like are also connected to the PCI bus.

The ASIC 16 is an integrated circuit (IC) dedicated to an image processing that includes image processing hardware elements. The ASIC 916 functions as a bridge that connects the AGP bus 15, PCI bus, HDD 18, and MEM-C 17.

The ASIC 16 includes a peripheral component interconnect (PCI) target, an accelerated graphic port (AGP) master, an arbiter (ARB) as a core of the ASIC 16, a memory controller for controlling the MEM-C 17, a plurality of direct memory access controllers (DMACs) for rotating image data with a hardware logic, and a PCI unit for transferring data between the engines 60 and 70 via the PCI bus.

The ASIC 16 is connected to a communication interface (I/F) 50, a universal serial bus (USB) 40, an institute of electrical and electronics engineers (IEEE) 1394 via the PCI bus. The operation panel 101 is directly connected to the ASIC 16.

The MEM-C 17 is a local memory used as a buffer for image data to be copied or coded. The HDD 18 is a storage for storing image data, programs, font data, and forms.

The AGP bus 15 is a bus interface for a graphics accelerator card that is proposed for enhancing the speed of graphic processing. The AGP bus 15 directly accesses the MEM-P 12 with high throughput to enhance the speed of the graphics accelerator card.

A program executed by the printing system 1 according to the above-described embodiment may be stored in any desired computer-readable storage medium such as a compact disc read-only memory (CD-ROM), a flexible disk (FD), a compact disc-recordable (CD-R), and a digital versatile disk (DVD) in an installable or executable file format, for distribution.

Further, the program executed by the printing system 1 according to the embodiments of the present disclosure may be stored on a computer connected to a network such as the Internet and downloaded via the network.

Alternatively, the program executed by the printing system 1 according to the embodiments of the present disclosure may be provided or distributed via a network such as the Internet.

Next, a function that the CPU 11 of the printing system 1 performs by executing a program stored in the HDD 18 or the ROM 12 a will be described. It should be noted that a description of known functions will be omitted here, and the unique functions exerted by the printing system 1 of the present embodiments will be described in detail.

Figure 8:
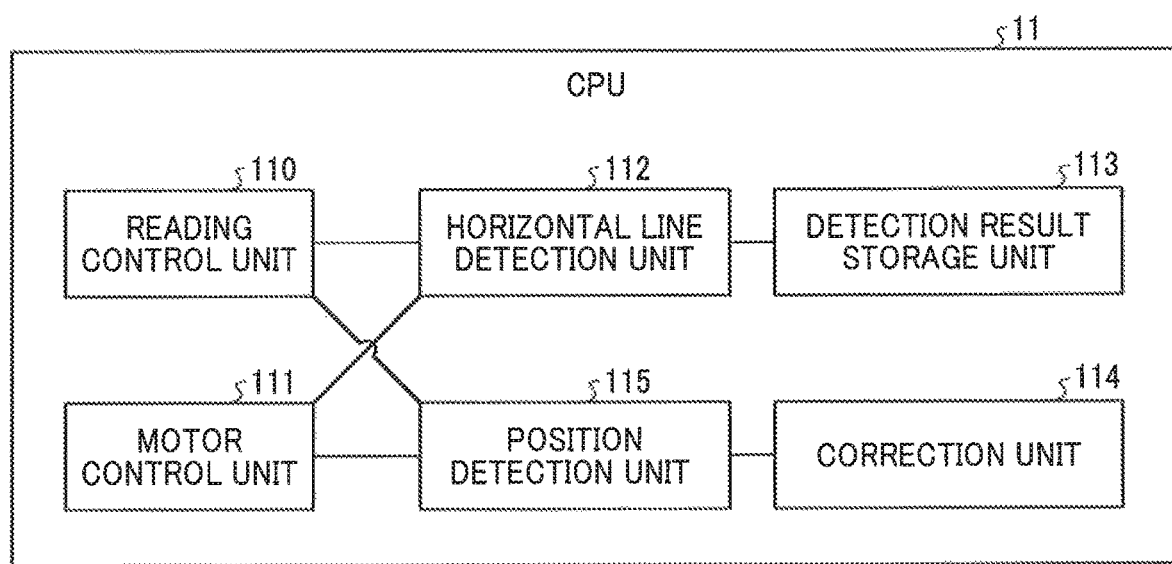
FIG. 8 is a block diagram of a functional configuration of the printing system in FIG. 1.

FIG. 8 is a block diagram of a functional configuration of the printing system 1.

As illustrated in FIG. 8, the CPU 11 of the printing system 1 functions as a reading control unit 110, a motor control unit 111, a horizontal line detection unit 112 as a reference pattern detection unit, a detection result storage unit 113, a calculation unit 114, and a position detection unit 115.

In addition to the reading control unit 110, the motor control unit 111, the horizontal line detection unit 112, the detection result storage unit 113, the correction unit 114, and the position detection unit 115, the CPU 11 may further function as a conveyance control unit to control conveyance of a recording medium.

In the present embodiment, the cases where the unique functions of the printing system 1 are implemented by executing the program by the CPU 11 are described above. Alternatively, some or all of the functions may be implemented by hardware such as a dedicated circuit.

The motor control unit 111 outputs a drive signal to the motor 204 to rotationally drive the rotator 203. In addition, the motor control unit 111 outputs a drive stop signal to the motor 204 to stop the rotation of the rotator 203.

The reading control unit 110 outputs a reading start signal to the reader 201 to start reading.

Upon receiving the reading signal from the reading device 201, the reading control unit 110 outputs a reading end signal to the reader 201 to terminate the reading operation.

The horizontal line detection unit 112 causes the motor control unit 111 to move the position reference member 202 in the sub-scanning direction. Further, the horizontal line detection unit 112 causes the reader 201 to read the position reference member 202 moving in the sub-scanning direction, under the control of the reading control unit 110. Then, the horizontal line detection unit 112 detects the coordinate in the sub-scanning direction of each sensor chip 210 of the reader 201.

Figure 9A:
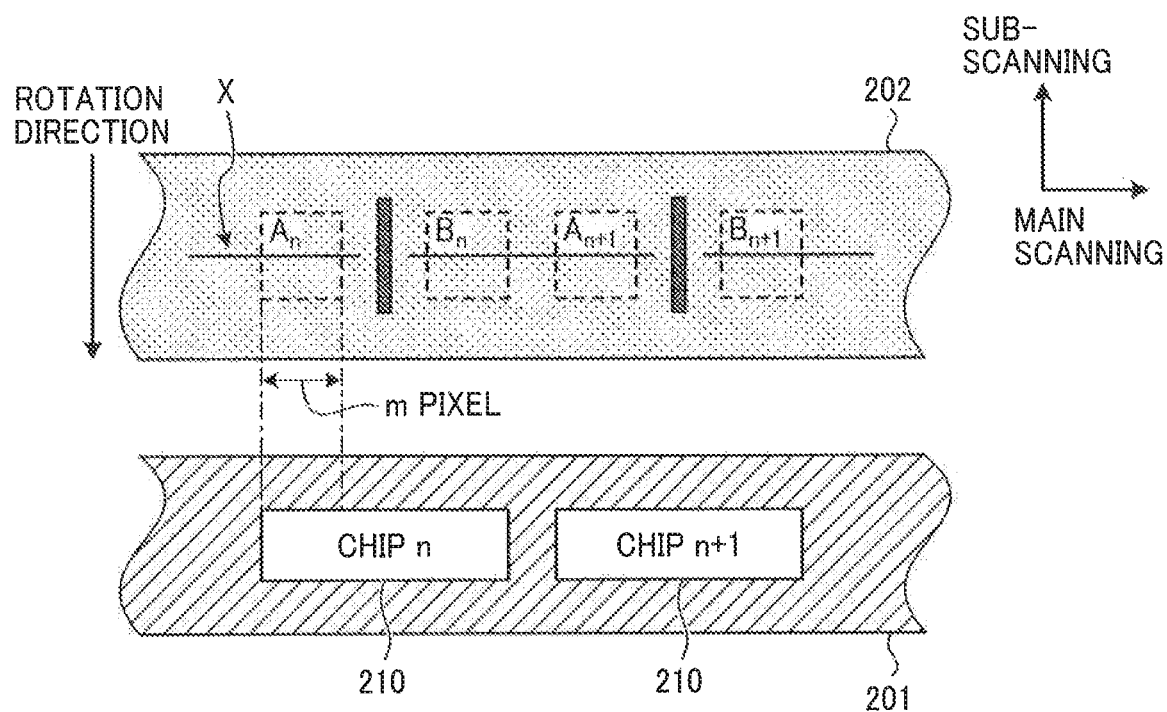
FIGS. 9A and 9B are illustrations of an example of how a coordinate in the sub-scanning direction of each sensor chip of the reader in FIG. 3 is calculated, according to an embodiment of the present disclosure.
Figure 9B:
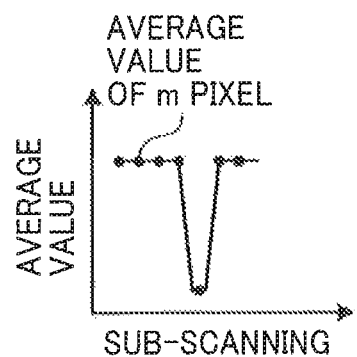

FIGS. 9A and 9B are illustrations for describing an example of how the coordinate in the sub-scanning direction of each sensor chip 210 of the reader 201 is calculated.

As illustrated in FIG. 9A, the horizontal line detection unit 112 reads horizontal lines X1 of the position reference member 202 in regions An, An+1, . . . , An+m or regions Bn, Bn+1, Bn+m for the respective sensor chips 210 of the reader 201, to detect a coordinate of each sensor chip 210 of the reader 201 in the sub-scanning direction.

As described above, the horizontal line X1 of the position reference member 202 is read by each sensor chip 210 at the substantially same pixel position. Such a configuration is advantageous to calculation in correction processing. However, no limitation is intended thereby. Alternatively, the horizontal line X1 of the position reference member 202 can be read by each sensor chip 210 by changing the pixel position for each sensor chip 210.

More specifically, the horizontal line detection unit 112 reads a region A or B (with a width of "m" number of pixel(s)) of each sensor chip 210 of the reader 201 while rotating the position reference member 202 in the sub-scanning direction. The read values of "m" number of pixels are averaged for each line of each sensor chip 210 of the reader 201, and the averaged value data is stored in the storage unit such as the RAM 12b and the HDD 18.

The horizontal line detection unit 112 detects the coordinate of each sensor chip 210 of the reader 201 from the positions of the rising edge and the falling edge of the obtained data.

The detection result storage unit 113 stores the coordinate of each sensor chip 210 of the reader 201 detected by the horizontal line detection unit 112, in the storage unit.

Figure 10:
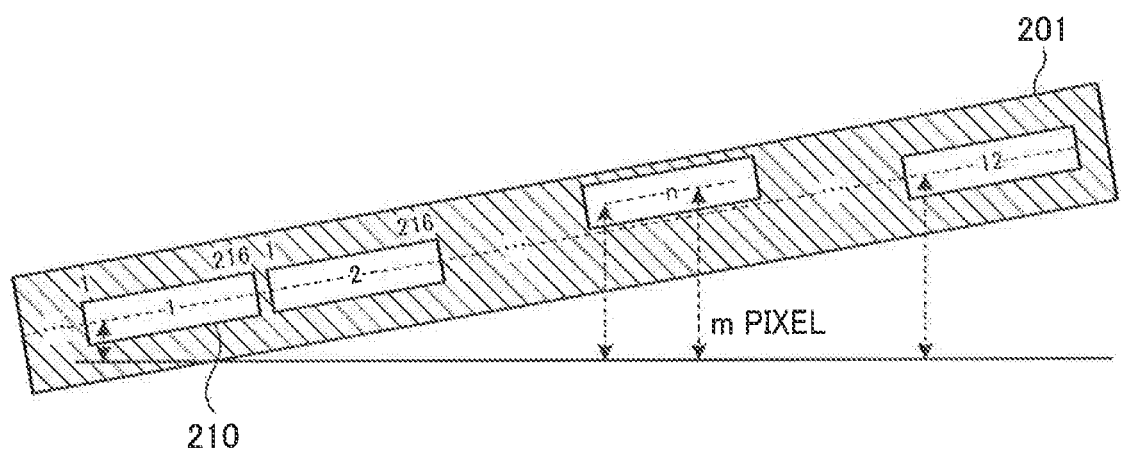
FIG. 10 is an illustration of a method of correcting inclination of the reader according to an embodiment of the present disclosure.

The correction unit 114 calculates a correction value of the inclination of the reader 201 to correct the position in the sub-scanning direction to detect the position of the reading target. FIG. 10 is an illustration of a method of correcting the inclination of the reader 201.

As illustrated in FIG. 10, the correction unit 114 calculates the total inclination of the reader 201 from the coordinate in the sub-scanning direction obtained by reading the horizontal lines X1 corresponding to the sensor chips 210 at the both ends of the reader 201.

A description is given below of an example of calculation of the total inclination of the reader 201 when twelve sensor chips 210 are arranged in the reader 201 and each sensor chip 210 includes 216.5 pixels. It should be noted that 0.5 pixel corresponds to the distance set for the gap between the sensor chips 210.

The total inclination of the reader 201=(the coordinate of the twelfth sensor chip 210 (chip 12) in the sub-scanning direction—the coordinate of the first sensor chip 210 (chip 1) in the sub-scanning direction)/(12×216.5). That is, the inclination of the reader 201 is obtained by subtracting the coordinate of the first sensor chip 210 in the sub-scanning direction from the coordinate of the twelfth sensor chip 210 in the sub-scanning direction and dividing the subtracted value by the product of 12 and 216.5.

After obtaining the inclination of the reader 201 as a whole, the correction unit 114 calculates a correction value in the sub-scanning direction at the pixel used for detecting the position. More specifically, the correction unit 114 acquires one of the coordinates in the sub-scanning direction of the sensor chips 210 of the reader 201, from the storage unit.

Then, using the acquired coordinate as a reference position, the correction unit 114 multiplies the total inclination of the reader 201 and a specific pixel (target pixel) corresponding to the sensor chip 210, to obtain a correction value of the target pixel.

An example of calculation of the correction value in the sub-scanning direction is described below. It should be noted that the symbols "m" indicates the number of pixels in the sensor chip 210. That is, "m" can be changed from 1 to 216 in this description.

Correction value=a positional coordinate of the n-th sensor chip 210 (chip "n") in the sub-scanning direction+total inclination of the reader 201×"m" (Therefore, the correction value is obtained by adding the product of the total inclination of the reader 201 and "m" to the coordinate of the n-th sensor) in the sub-scanning direction.

It should be noted that, when each sensor chip 210 has any desired pixel position to read the horizontal line X1 of the position reference member 202, the following formula is used to obtain a correction value:

Correction value=positional coordinate of the n-th sensor chip 210 (p-th pixel) in the sub-scanning direction+total inclination of the reader 201×(m−p)

where p indicates the number of pixels ("p" pixels) counted from the leading pixel in the specific sensor chip used for calculating the correction value.

Further, a case where two readers 201A and 201B are arranged side by side are described.

FIG. 11 is an illustration of a method of correcting inclination of two readers 201A and 201B according to an embodiment of the present disclosure.

As illustrated in FIG. 11, when two readers 201A and 201B are disposed side by side, the readers 201A and 201B are independent from each other. In this case, the readers 201A and 201B have different coordinates in the sub-scanning direction and different inclination degrees with respect to the position reference member 202.

When the readers 201A and 201B are disposed side by side, the correction unit 114 calculates the inclination of each of the reader 201A and 201B from the coordinates in the sub-scanning direction of the both ends of the readers 201A and 201B), so as to perform the correction operation.

The same applies to the case where three or more readers 201 are arranged side by side.

As to the readers 201A and 201B, the horizontal line X1 of the position reference member 202 is not required to be read by each sensor chip 210 at substantially the same pixel position. Instead, the horizontal line X1 of the position reference member 202 can be read by each sensor chip 210 by changing the pixel position for each sensor chip 210.

The position detection unit 115 detects the outer shape of the recording medium and the position of the image pattern on the recording medium from the image read by the reader 201.

Figure 12A:
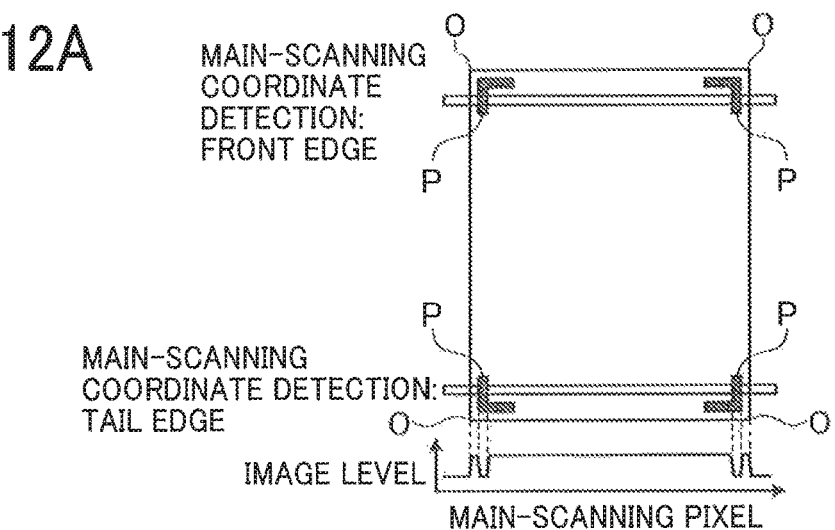
FIGS. 12A, 12B, and 12C are illustrations of a method of calculating an outer shape of a recording medium and a position of an image pattern on the recording medium according to an embodiment of the present disclosure.
Figure 12B:
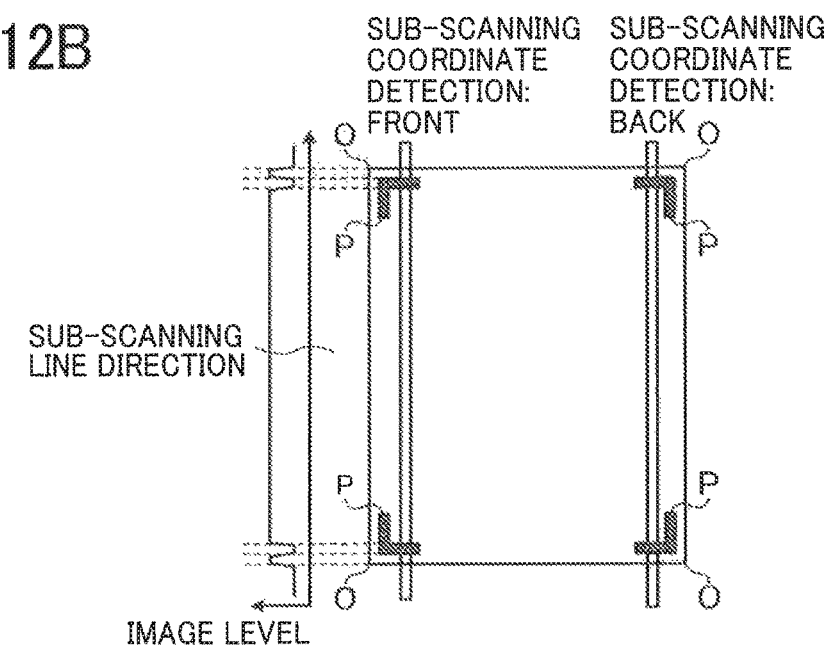
Figure 12C:
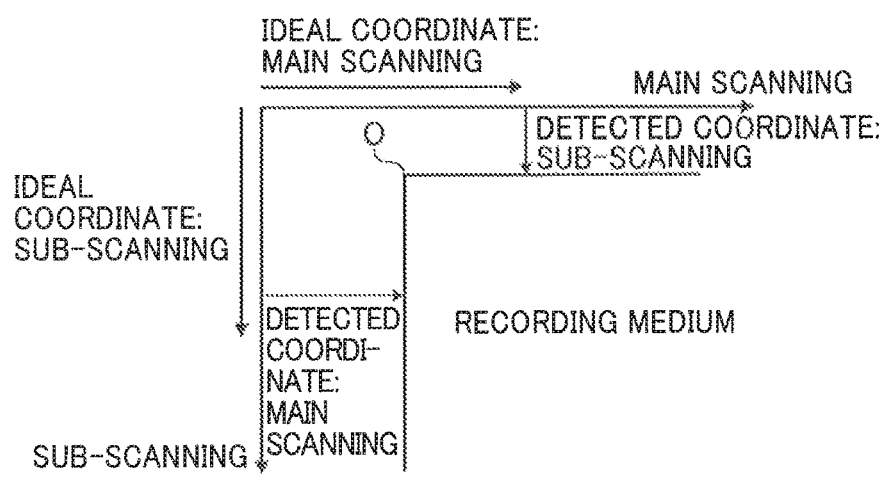

FIGS. 12A, 12B, and 12C are illustrations of a method of calculating the outer shape of the recording medium and the position of an image pattern on the recording medium.

As illustrated in FIGS. 12A and 12B, an L-shaped image pattern "P" is formed at the four corners "O" of the recording medium such as a sheet (e.g., paper). The position detection unit 115 detects the sheet edge and the beginning and end coordinates of the image pattern from the image levels in the main scanning direction and the sub-scanning direction. For example, when the outer shape of the recording medium is to be obtained, the position detection unit 115 detects the coordinates of four positions in the main scanning direction and four positions in the sub-scanning direction, and obtains the intersection points of these positions as the four corners "O" at the edges of the recording medium.

As illustrated in FIG. 12C, the position detection unit 115 determines the sub-scanning directional coordinate in the case of detecting the main scanning directional coordinate (main scanning directional coordinate in the case of detecting the sub-scanning directional coordinate) when determining the intersection points on the recording medium, as an ideal value for a sub-scanning directional position that depends on the read position of the recording medium.

It should be noted that the position detection unit 115 can directly calculate the four corners "O" when the memory has sufficient capacity and data of all the pixels is extracted from the storage unit (memory) before the ends of the recording medium is calculated.

Figure 13A:
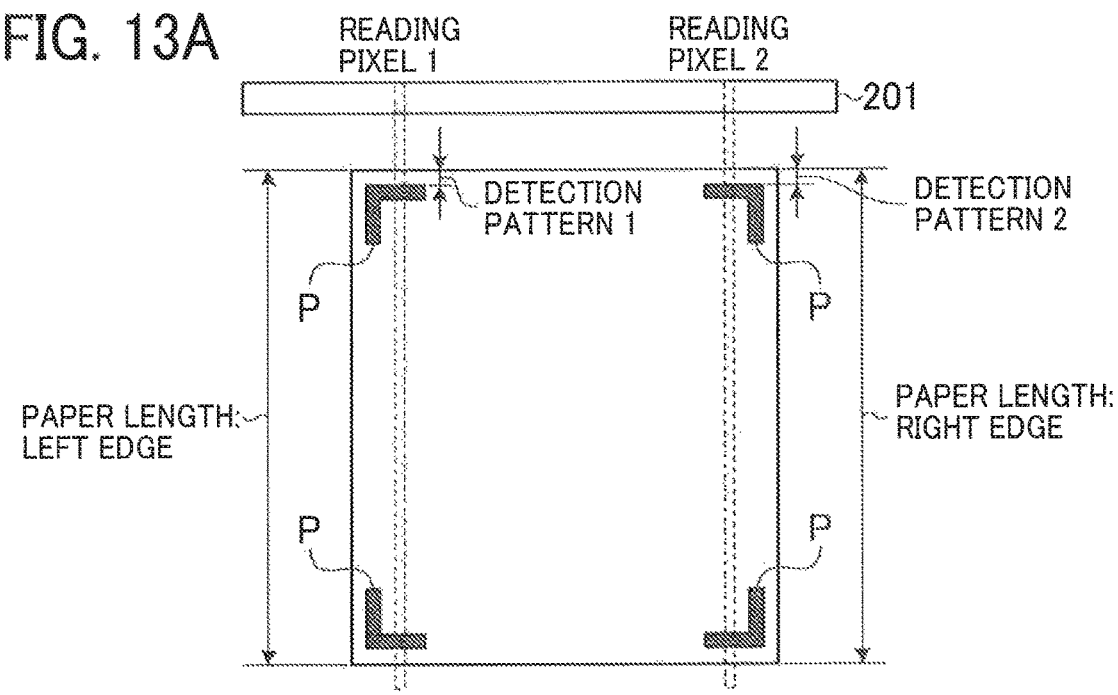
FIGS. 13A and 13B are illustrations of examples of images detected by the reader according to an embodiment of the present disclosure.
Figure 13B:
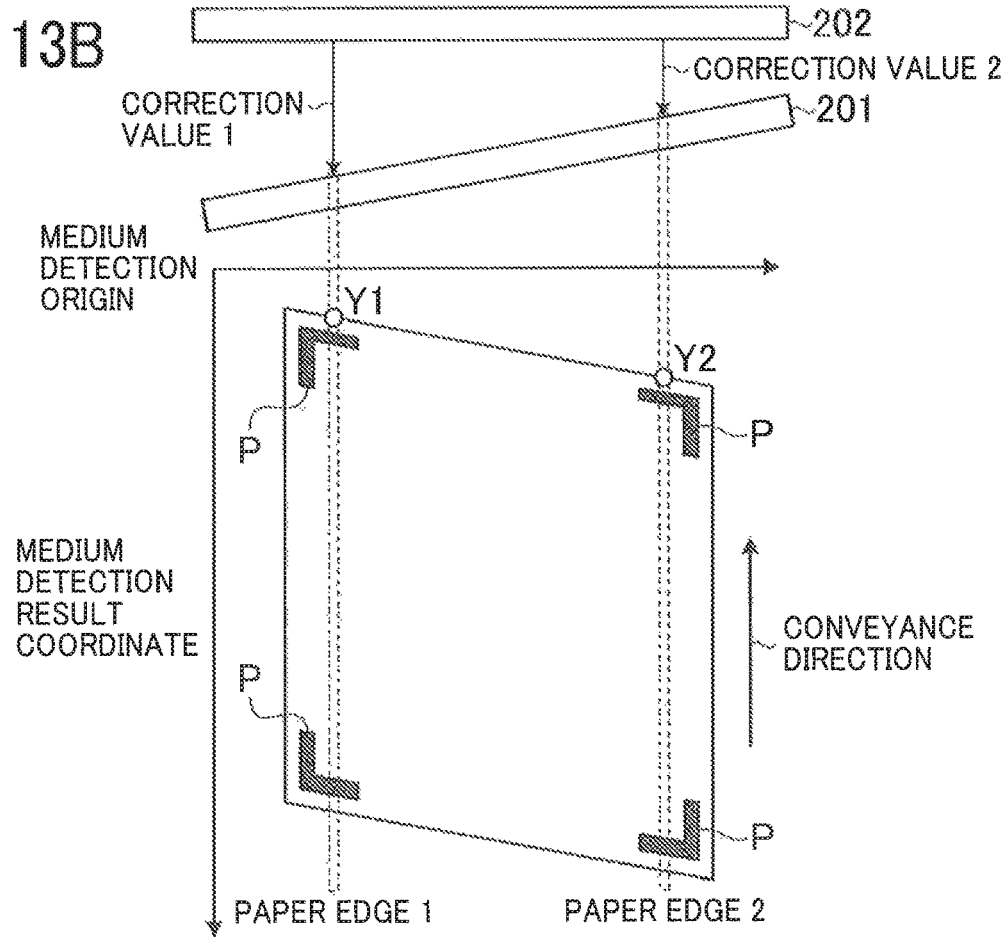

FIGS. 13A and 13B are illustrations of examples of images detected by the reader 201. FIG. 13A is an illustration of a detected image when the reader 201 is disposed orthogonal to the direction of conveyance of the recording medium. FIG. 13B is an illustration of a detected image when the reader 201 is inclined with respect to the direction of conveyance of the recording medium.

As illustrated in FIG. 13B, if the reading device 201 is inclined with respect to the direction of conveyance of the recording medium, the image detected by the reader 201 appears distorted by the amount of inclination of the reader 201.

Therefore, in the present embodiment, the position detection unit 115 refers to the position in the sub-scanning direction corrected by the correction unit 114, used to detect the position of the recording medium.

Figures 14, 15:
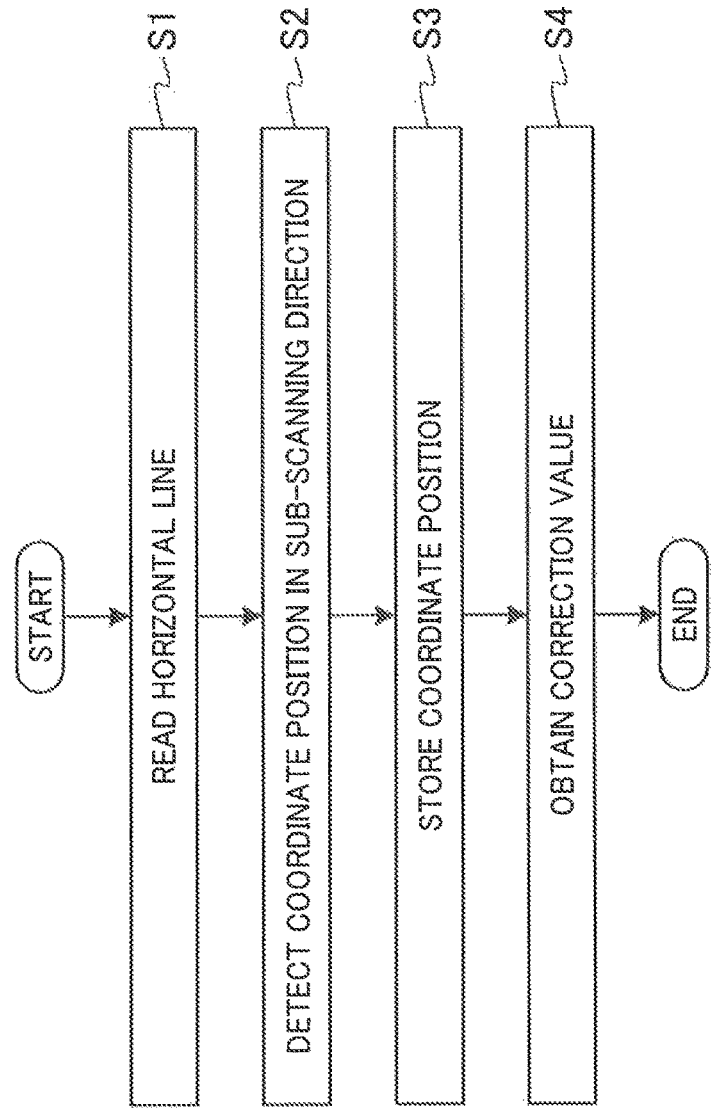
FIG. 14 is an illustration of a table of a correction example in FIG. 13B.
FIG. 15 is a flowchart of processes of correction processing.

FIG. 14 is an example of an illustration of a table of the correction value for an example case of FIG. 13B.

Next, the correction value processing executed by the printing system 1 will be described.

FIG. 15 is a flowchart of the correction value processing. As illustrated in FIG. 11, upon detecting a horizontal-line reading start trigger, the horizontal line detection unit 112 starts reading the horizontal line X1 of the position reference member 202 while moving the position reference member 202 in the sub-scanning direction (step S1).

More specifically, the horizontal line detection unit 112 causes the motor control unit 111 to move the position reference member 202 in the sub-scanning direction. Further, the horizontal line detection unit 112 reads the position reference member 202 moving in the sub-scanning direction, using the reader 201 under the control of the reading control unit 110.

When the reading operation performed by the reader 201 ends, the reader 201 outputs a reading end trigger to the horizontal line detection unit 112.

Upon receiving the reading end trigger, the horizontal line detection unit 112 stops the position reference member 202 moving in the sub-scanning direction, so that the position reference member 202 is set in a standby state.

Further, upon receiving the reading end trigger, the horizontal line detection unit 112 detects the coordinate in the sub-scanning direction of each sensor chip 210 of the reader 201 (step S2).

Next, the detection result storage unit 113 stores the coordinate of each sensor chip 210 of the reader 201 detected by the horizontal line detection unit 112, in the storage unit (step S3).

Next, the correction unit 114 calculates a correction value of the inclination of the reader 201 (step S4).

With such a configuration according to the embodiment of the present disclosure, the displacement of the installation position of the reader 201 can be accurately detected irrespective of the inclination of the reader 201 and the position of each sensor chip 210 of the reader 201.

In the present embodiment, a CIS, which is an equal magnification optical system, is applied as the reader 201. However, no limitation is intended thereby.

For example, the reader 201 may be a so-called reduced optical system including a light source, a plurality of reflection members (mirrors), an imaging lens, and a linear image sensor. That is, the reader 201 may be any device capable of detecting the position of a target to be read, and the use of such a device can improve an accuracy of detection of positions.

In the present embodiment, the total inclination of the reader 201 is calculated from the coordinates in the sub-scanning direction obtained by reading two horizontal lines X1 corresponding to the sensor chips 210 at the end of the reader 201. However, no limitation is indicated thereby.

Alternatively, the total inclination of the reading device 201 may be calculated from the coordinates in the sub scanning direction at which the horizontal lines X1 corresponding to all of the sensor chips 210 have been read, so as to calculate correction values for all the pixels. In the above-described embodiments, the cases where the reading device and the image forming apparatus mounted with the reading device are applied to a printing system including an electrophotographic printing apparatus are described. Alternatively, the reading device and the image forming apparatus mounted with the reading device may be applied to a printing system including an ink-jet printing apparatus.

In the above-described embodiments, the cases where the reading device and the image forming apparatus mounted with the reading device are applied to a printing system including a printing apparatus such as a commercial printing machine (production printing machine) are described. Alternatively, the reading device and the image forming apparatus mounted with the reading device are applicable to any image forming apparatus such as a multifunction peripheral having at least two of a copy function, a printer function, a scanner function and a facsimile function, a copying machine, a printer, a scanner, and a facsimile apparatus.

Furthermore, in the above-described embodiments, the cases where the reading device is used to detect the positions in the field of forming an image are described. Alternatively, the reading device according to the present disclosure may be applied to position detection applications in various fields such as inspection in the factory automation (FA) field.

Further, the reading device according to the embodiments of the present disclosure is applicable in a bill reading apparatus that determines whether bills are printed in correct positions and shapes so as to discriminate bills and prevent forgery.

Further, the reading device according to the embodiments of the present disclosure is applicable in a bill reading apparatus that determines whether bills are printed in correct positions and shapes so as to discriminate bills and prevent forgery.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A reading device comprising:
   a solid plate having a reference pattern having a horizontal line extending along a main scanning direction of the solid plate and a plurality of vertical lines perpendicular to the horizontal line, the solid plate movable in a sub-scanning direction orthogonal to the main scanning direction;
   a reader including a plurality of sensor chips arranged along the main scanning direction, wherein a length of the solid plate in the main scanning direction corresponds with a length of the reader in the main scanning direction, and wherein each of the plurality of vertical lines of the solid plate faces a respective one of each of the plurality of sensor chips; and
   circuitry configured to:
      detect the reference pattern of the solid plate using the reader;
      determine coordinates of at least two sensor chips in the sub-scanning direction, based on the detected reference pattern of the solid plate; and
      correct a position of a reading target in the sub-scanning direction based on the coordinates determined for the at least two sensor chips of the reader in the sub-scanning direction.

2. The reading device according to claim 1,
   wherein the solid plate is fixed on a roller that rotates between a first position and a second position, and
   wherein when the roller moves to the first position, the solid plate faces the reader and when the roller moves to the second position the solid plate does not face the reader.

3. The reading device according to claim 1,
   wherein the circuitry is configured to calculate a correction value in the sub-scanning direction at a pixel used for detecting the position of the reading target.

4. The reading device according to claim 3,
   wherein the circuitry is configured to:
      obtain an inclination of the reader based on the detected coordinates determined for the at least two sensor chips in the sub-scanning direction; and
      calculate the correction value based on the obtained inclination of the reader.

5. The reading device according to claim 1,
   wherein the horizontal line is in contact with the vertical line at an end of the horizontal line.

6. An image forming apparatus comprising:
   the reading device according to claim 1;
   a print engine; and
   circuitry configured to:
      control a conveyance of a recording medium onto which an image is formed by the print engine;

detect an outer shape of the recording medium and a position of an image pattern on the recording medium by reading the image formed on the recording medium using the reading device;

correct a position of the reading target in the sub-scanning direction based on the coordinates determined for the at least two sensor chips of the reader in the second direction.

7. A method of calculating a correction value using a solid plate including a reference pattern having a line extending along a main scanning direction of the solid plate, the solid plate movable in a sub-scanning direction orthogonal to the main scanning direction, and a reader including a plurality of sensor chips arranged along the main scanning direction of the reader, wherein a length of the solid plate in the main scanning direction corresponds with a length of the reader in the main scanning direction, and wherein each of the plurality of vertical lines of the solid plate faces a respective on of each of the plurality of sensor chips, the method comprising:

detecting, using the reader, the reference pattern having a horizontal line extending along the main scanning direction of the reference pattern member and a plurality of vertical lines perpendicular to the horizontal line, the reference pattern corresponding to each of the plurality of sensor chips arranged along the main scanning direction in the reader;

determining coordinates of at least two sensor chips in the sub-scanning direction, among the plurality of sensor chips, based on the detected reference pattern of the solid plate; and correcting a position of a reading target in the sub-scanning direction based on the coordinates determined for the at least two sensor chips of the reader in the sub-scanning direction.

8. A non-transitory recording medium storing a program for causing a computer to execute the method according to claim 7.

9. The reading device according to claim 7, wherein the each of the plurality of vertical lines is at a center of the each of the plurality of sensor chips.

10. The reading device according to claim 1, wherein the horizontal line extends across the each of the plurality of vertical lines.

* * * * *